United States Patent
Tsutsui et al.

(10) Patent No.: US 9,695,756 B2
(45) Date of Patent: Jul. 4, 2017

(54) FUEL SUPPLY CONTROL APPARATUS FOR BI-FUEL INTERNAL COMBUSTION ENGINE, AND METHOD OF SWITCHING FUEL IN BI-FUEL INTERNAL COMBUSTION ENGINE

(71) Applicant: AISAN KOGYO KABUSHIKI KAISHA, Aichi-ken (JP)

(72) Inventors: Daisuke Tsutsui, Tokai (JP); Akito Onishi, Nagoya (JP); Takao Komoda, Okazaki (JP)

(73) Assignees: Aisan Kogyo Kabushiki Kaisha, Aichi-ken (JP); Toyota Jidosha Kabushiki Kaisha, Aichi-ken (JP)

( * ) Notice: Subject to any disclaimer, the term of this patent is extended or adjusted under 35 U.S.C. 154(b) by 424 days.

(21) Appl. No.: 14/360,762

(22) PCT Filed: Nov. 27, 2012

(86) PCT No.: PCT/JP2012/080534
§ 371 (c)(1),
(2) Date: May 27, 2014

(87) PCT Pub. No.: WO2013/080935
PCT Pub. Date: Jun. 6, 2013

(65) Prior Publication Data
US 2014/0311460 A1    Oct. 23, 2014

(30) Foreign Application Priority Data
Nov. 30, 2011    (JP) .................................. 2011-262411

(51) Int. Cl.
*F02M 51/00*    (2006.01)
*F02D 19/06*    (2006.01)
(Continued)

(52) U.S. Cl.
CPC .......... *F02D 19/06* (2013.01); *F02D 19/061* (2013.01); *F02D 19/0615* (2013.01);
(Continued)

(58) Field of Classification Search
CPC .. F02D 19/06; F02D 19/0692; F02D 19/0647; F02D 19/0628; F02D 19/0623;
(Continued)

(56) References Cited

U.S. PATENT DOCUMENTS

2011/0132321 A1    6/2011    Pursifull
2012/0245825 A1    9/2012    Nakayama et al.
2012/0277981 A1    11/2012    Nakayama

FOREIGN PATENT DOCUMENTS

DE    10239397 A1    3/2004
JP    07-034914    2/1995
(Continued)

OTHER PUBLICATIONS

Chinese First Office Action for Chinese Application No. 201280058561.6 dated Dec. 28, 2015. English translation provided.
(Continued)

*Primary Examiner* — Hung Q Nguyen
(74) *Attorney, Agent, or Firm* — Patterson Thuente Pedersen, P.A.

(57) ABSTRACT

When switching the fuel to be used for engine operation from gasoline to CNG, in a state where CNG is supplied experimentally to one cylinder serving as a judgment object and gasoline is supplied to other cylinders, whether or not CNG can be supplied to the cylinder serving as a judgment object is judged based on an amount of change ΔPc in fuel pressure inside a CNG delivery pipe (Step S13 to Step S16). When it is judged that a gas fuel can be supplied to all
(Continued)

cylinders (Step S19: YES), the fuel to be used for engine operation is switched from the liquid fuel to the gas fuel (Step S20).

10 Claims, 7 Drawing Sheets

(51) Int. Cl.
*F02D 41/00* (2006.01)
*F02M 21/02* (2006.01)
*F02D 41/06* (2006.01)

(52) U.S. Cl.
CPC ..... *F02D 19/0623* (2013.01); *F02D 19/0628* (2013.01); *F02D 19/0647* (2013.01); *F02D 19/0692* (2013.01); *F02D 41/008* (2013.01); *F02D 41/0025* (2013.01); *F02M 21/0272* (2013.01); *F02D 41/0027* (2013.01); *F02D 41/064* (2013.01); *F02D 2200/0602* (2013.01); *Y02T 10/32* (2013.01); *Y02T 10/36* (2013.01)

(58) Field of Classification Search
CPC ............... F02D 19/061; F02D 19/0615; F02D 41/0025; F02D 41/008; F02D 41/064; F02D 2200/0602; F02M 21/0272; Y02T 10/32; Y02T 10/36
See application file for complete search history.

(56) References Cited

FOREIGN PATENT DOCUMENTS

| JP | 11-324779 | 11/1999 |
|---|---|---|
| JP | 2000-282955 | 10/2000 |
| JP | 2000-345916 | 12/2000 |
| JP | 2001-065395 | 3/2001 |
| JP | 2003-293807 | 10/2003 |
| JP | 2004346842 | 12/2004 |
| JP | 2005-163755 | 6/2005 |
| JP | 2009-168026 | 7/2009 |
| JP | 2009-185815 | 8/2009 |
| WO | WO 2011/111164 | 9/2011 |
| WO | WO2011114508 | 9/2011 |

OTHER PUBLICATIONS

EP Communication for Application No. 12853679.4, mailed Mar. 2, 2016 (8 pages).
Translation of PCT International Preliminary Report on Patentability (Form PCT/IPEA/409) for PCT/JP2012/080534 (5 pages).

FUEL SUPPLY CONTROL APPARATUS FOR BI-FUEL INTERNAL COMBUSTION ENGINE, AND METHOD OF SWITCHING FUEL IN BI-FUEL INTERNAL COMBUSTION ENGINE

RELATED APPLICATIONS

The present application is a National Phase entry of PCT Application No. PCT/JP2012/080534, filed Nov. 27, 2012, which application claims priority to Japanese Patent Application No. 2011-262411 filed Nov. 30, 2011, both of said applications being hereby incorporated by reference in their entirety.

FIELD OF THE INVENTION

The present invention relates to a fuel supply control device for a bi-fuel internal combustion engine in which a liquid fuel and a gas fuel can be used as a fuel to be used for engine operation. The present invention also relates to a method for switching a fuel in a bi-fuel internal combustion engine by which a fuel to be used for operating a bi-fuel internal combustion engine from a liquid fuel to a gas fuel during operation of the bi-fuel internal combustion engine can be switched.

BACKGROUND OF THE INVENTION

As an internal combustion engine, a bi-fuel internal combustion engine for which a liquid fuel such as gasoline and a gas fuel such as CNG (compressed natural gas) can be used is known. In the bi-fuel internal combustion engine, a liquid fuel is used to start the engine, and thereafter, the fuel to be used for engine operation is switched from the liquid fuel to a gas fuel. A vehicle equipped with the bi-fuel internal combustion engine includes a storage container for storing a gas fuel. In the storage container, a gas fuel kept at a high pressure is stored. However, the gas fuel in the storage container contains impurities such as misty oil mixed in the process of compression to high pressure.

When the gas fuel containing oil is injected from an injection valve, oil adheres to the valving element and the valve seat, etc., forming the injection valve. When the outside air temperature reaches "−30° C." or lower, the oil adhering to the injection valve is solidified and the injection valve does not normally open. Therefore, when the injection valve binds or may bind, it is preferable that switching from a liquid fuel to a gas fuel is prohibited.

Patent Document 1 discloses a method for judging whether or not the injection valve that injects a gas fuel binds. With this method, based on an outside air temperature, whether or not an environment in which an internal combustion engine is installed is at an extremely low temperature is judged. The result of use of this judging method for a bi-fuel internal combustion engine in which a fuel to be used during engine operation is switched from a liquid fuel to a gas fuel is as follows. When it is judged that the installation environment is not at an extremely low temperature based on an outside air temperature, it is estimated that the injection valve does not bind and the gas fuel can be normally injected from the injection valve. In this case, the fuel to be used for engine operation is switched from the liquid fuel to the gas fuel. On the other hand, when it is judged that the installation environment is at an extremely low temperature, it is estimated that there is a possibility that the injection valve binds and the gas fuel cannot be normally injected from the injection valve. In this case, the engine operation using the liquid fuel is continued.

However, the above-described judging method is based on the outside air temperature, and even in some cases where it is estimated that the injection valve does not bind, in actuality the injection valve still binds. If the fuel is switched from the liquid fuel to the gas fuel while the injection valve binds, a proper amount of the gas fuel corresponding to a required output is not supplied to a cylinder corresponding to the injection valve that binds. Specifically, smooth switching from the liquid fuel to the gas fuel cannot be performed.

SUMMARY OF THE INVENTION

An object of the present invention is to provide a fuel supply control device for a bi-fuel internal combustion engine capable of smoothly switching a fuel to be used for engine operation from a liquid fuel to a gas fuel, and a method for switching a fuel in a bi-fuel internal combustion engine.

To achieve the above-described object, a first aspect of the present invention provides a fuel supply control device for a bi-fuel internal combustion engine in which a liquid fuel and a gas fuel can be used as a fuel to be used for engine operation. The fuel supply control device switches the fuel to be used for engine operation from a liquid fuel to a gas fuel during engine operation. The fuel supply control device judges whether or not a gas fuel can be supplied to a cylinder that serves as a judgment object based on a fuel parameter that fluctuates according to supply of the gas fuel to the cylinder in a state where the gas fuel is supplied experimentally to the cylinder serving as a judgment object, and a liquid fuel is supplied to other cylinders. Further, the fuel supply control device switches the fuel to be used for engine operation from the liquid fuel to the gas fuel when the fuel supply control device judges that the gas fuel can be supplied to all of the cylinders.

With this construction, in a state where the bi-fuel internal combustion engine is operated by using the liquid fuel, when switching the fuel to be used from the liquid fuel to the gas fuel, the judging process is performed for each cylinder. In the judging process, the gas fuel is supplied experimentally to one cylinder (for example, a first cylinder), and the liquid fuel is supplied to the other cylinders. Then, whether or not the gas fuel can be supplied to the first cylinder is judged based on a fuel parameter that fluctuates according to supply of the gas fuel to the cylinder. Subsequently, when judging whether or not the gas fuel can be supplied to a second cylinder, the gas fuel is supplied experimentally to the second cylinder, and the liquid fuel is supplied to the other cylinders (including the first cylinder). Then, based on the fuel parameter, whether or not the gas fuel can be supplied to the second cylinder is judged. Specifically, in the present invention, by actually supplying a gas fuel to one cylinder that serves as a judgment object, based on the degree of fluctuation of the fuel parameter, whether or not the gas fuel can be supplied to the cylinder serving as a judgment object is judged. Therefore, the accuracy of judgment as to whether or not the gas fuel can be injected is improved and is higher than that in the case where whether or not the gas fuel can be supplied to the cylinder is estimated by using the outside air temperature. When performing the judging process, the liquid fuel is supplied to cylinders other than the cylinder serving as a judgment object. Specifically, even if the gas fuel cannot be supplied to the cylinder serving as a judgment object, the liquid fuel is supplied to the other cylinders. Therefore, even during the judging process, the operation of the bi-fuel internal combustion engine can be continued. This judging process is performed for all of the cylinders. When it is judged that the gas fuel can be supplied to all of the cylinders, the fuel to be used for engine operation is switched from the liquid fuel to the gas fuel. Therefore, even when the fuel to be used for engine operation is switched to gas fuel, the gas fuel is properly supplied to all cylinders, and the engine operation can be continued. Therefore, during operation of the bi-fuel internal combustion engine, the fuel to be used for engine operation can be switched from liquid fuel to gas fuel.

In the above-described fuel supply control device, preferably, when the fuel supply control device judges that there is a cylinder to which the gas fuel cannot be supplied, the fuel supply control device continues the engine operation using the liquid fuel.

With this construction, when there is a cylinder to which the gas fuel cannot be supplied or a cylinder to which the gas fuel may not be supplied, switching of the fuel to be used for engine operation to the gas fuel can be restrained.

In the above-described fuel supply control device, preferably, when the fuel supply control device judges that there is a cylinder to which the gas fuel cannot be supplied and continues the engine operation using the liquid fuel, the fuel supply control device acquires a viscosity parameter, and the viscosity parameter is a parameter from which the degree of lowering of viscosity of impurities adhering to the injection valve for gas injection can be estimated. When a re-judgment permission condition based on the viscosity parameter is satisfied, the fuel supply control device performs the judging process again for at least the cylinder to which it was judged that the gas fuel cannot be supplied, of all of the cylinders.

The cases where the gas fuel cannot be supplied to a cylinder include cases in which impurities adhering to the gas fuel injection valve have solidified. The problem of solidification of impurities can be easily solved by raising the temperature of the injection valve for a gas fuel. Therefore, according to the present invention, when it is judged that there is a cylinder to which the gas fuel cannot be supplied in the previous judging process and the engine operation using the liquid fuel is continued, the viscosity parameter is acquired. The viscosity parameter is a parameter from which the degree of lowering of viscosity of impurities adhering to the injection valve for a gas fuel can be estimated. When the re-judgment permission condition based on the viscosity parameter is satisfied, the judging process is performed again for at least the cylinder to which it was judged that gas fuel cannot be supplied, of all of the cylinders. Then, when it is judged that the gas fuel can be supplied to all cylinders including the cylinder for which the judging process was performed again, the fuel to be used for engine operation is switched from the liquid fuel to the gas fuel. Therefore, during operation of the bi-fuel internal combustion engine, the fuel to be used for engine operation can be smoothly switched from the liquid fuel to the gas fuel.

In the above-described fuel supply control device, preferably, when the re-judgment permission condition is satisfied, the fuel supply control device performs the judging process again for all of the cylinders.

With this construction, when the re-judgment permission condition is satisfied and the judging process is performed, the judging process is performed for each of all cylinders including a cylinder to which it was judged that gas fuel can be supplied in the previous judging process. Therefore, the accuracy of the judgment as to whether or not the gas fuel can be supplied to all cylinders is improved and is higher than that in a case where the judging process is performed again for only the cylinder to which it was judged that fuel gas cannot be supplied. Therefore, during operation of the bi-fuel internal combustion engine, the fuel to be used for engine operation can be smoothly switched from the liquid fuel to the gas fuel.

Preferably, when the re-judgment permission condition is satisfied, the above-described fuel supply control device performs the judging process again for only the cylinder to which it was judged that gas fuel cannot be supplied.

With this construction, when the re-judgment permission condition is satisfied and the judging process is performed, the judging process is performed for only the cylinder to which it was judged that gas fuel cannot be supplied. Specifically, the judging process is not performed for a cylinder to which it was judged that gas fuel can be supplied before the re-judgment permission condition is satisfied. Therefore, the time required for the judgment becomes shorter than in the case where the judging process is performed again for all cylinders after the re-judgment permission condition is satisfied. However, when it is judged that there is no cylinder to which the gas fuel can be supplied, the judging process is performed again for all cylinders after the re-judgment permission condition is satisfied.

In the above-described fuel supply control device, preferably, when a cylinder to which the gas fuel cannot be supplied is detected through the judging process performed for all of the cylinders, the fuel supply control device continues the engine operation using the liquid fuel without performing the judging process for other cylinders for which the judging process has not been performed.

With this construction, in the case where all injection valves for the gas fuel normally operate, after the judging process is performed for each of all cylinders, the fuel to be used for engine operation is switched from the liquid fuel to the gas fuel. On the other hand, when at least one injection valve for gas fuel does not normally operate, at a timing at which a cylinder to which the gas fuel cannot be supplied is detected, switching of the fuel to be used for engine operation from the liquid fuel to the gas fuel is prohibited without performing the judging process for other cylinders. Therefore, the time required for the judgment becomes shorter than in the case where continuation of the engine operation using the liquid fuel is determined after the judging process is performed for other cylinders for which the judging process has not been performed.

In the above-described fuel supply control device, preferably, when it is judged that there is a cylinder to which the gas fuel cannot be supplied and the engine operation using the liquid fuel is continued, the fuel supply control device acquires a viscosity parameter, and the viscosity parameter is a parameter from which the degree of lowering of viscosity of impurities adhering to the injection valve for gas injection can be estimated, and when the re-judgment permission condition based on the viscosity parameter is satisfied, the fuel supply control device performs the judging process for the cylinder to which it was judged that gas fuel cannot be supplied in the previous judging process and cylinders for which the judging process was not performed.

With this construction, when the re-judgment permission condition is satisfied and the judging process is performed, the judging process is performed for each of the cylinders to which it was judged that gas fuel cannot be supplied and cylinders for which the judging process was not performed. Therefore, the time required for the judgment becomes shorter than in the case where the judging process is performed again for all cylinders after the re-judgment permission condition is satisfied.

In the above-described fuel supply control device, preferably, the fuel parameter is a pressure inside the delivery pipe for supplying a gas fuel to the injection valve for a gas fuel, a rotation speed of the crankshaft of the bi-fuel internal combustion engine, or a temperature inside the delivery pipe for supplying the gas fuel to the injection valve for a gas fuel.

In the above-described fuel supply control device, preferably, the viscosity parameter is a temperature rise value of the injection valve for a gas fuel after continuation of the engine operation using the liquid fuel is determined, an elapsed time after continuation of the engine operation using the liquid fuel is determined, or a temperature rise value inside the delivery pipe after continuation of the engine operation using the liquid fuel is determined.

In order to achieve the above-described object, a second aspect of the present invention provides a method for switching a fuel in a bi-fuel internal combustion engine arranged to switch the fuel to be used for engine operation from a liquid fuel to a gas fuel during operation of the bi-fuel internal combustion engine using the liquid fuel. This method includes a judging step of judging whether or not the gas fuel can be supplied to one cylinder that serves as a judgment object based on a fuel parameter that fluctuates according to supply of the gas fuel to the cylinder in a state where the gas fuel is supplied experimentally to the cylinder serving as a judgment object, and the liquid fuel is supplied to other cylinders, and a switching step of switching the fuel to be used for engine operation from the liquid fuel to the gas fuel when it is judged that the gas fuel can be supplied to all of the cylinders.

With this construction, effects equivalent to those of the fuel supply control device for a bi-fuel internal combustion engine can be obtained.

DETAILED DESCRIPTION OF THE PREFERRED EMBODIMENTS

Hereinafter, a first embodiment embodying a fuel supply control device for a bi-fuel internal combustion engine according to the present invention is described with reference to FIG. 1 to FIG. 5.

Figure 1:
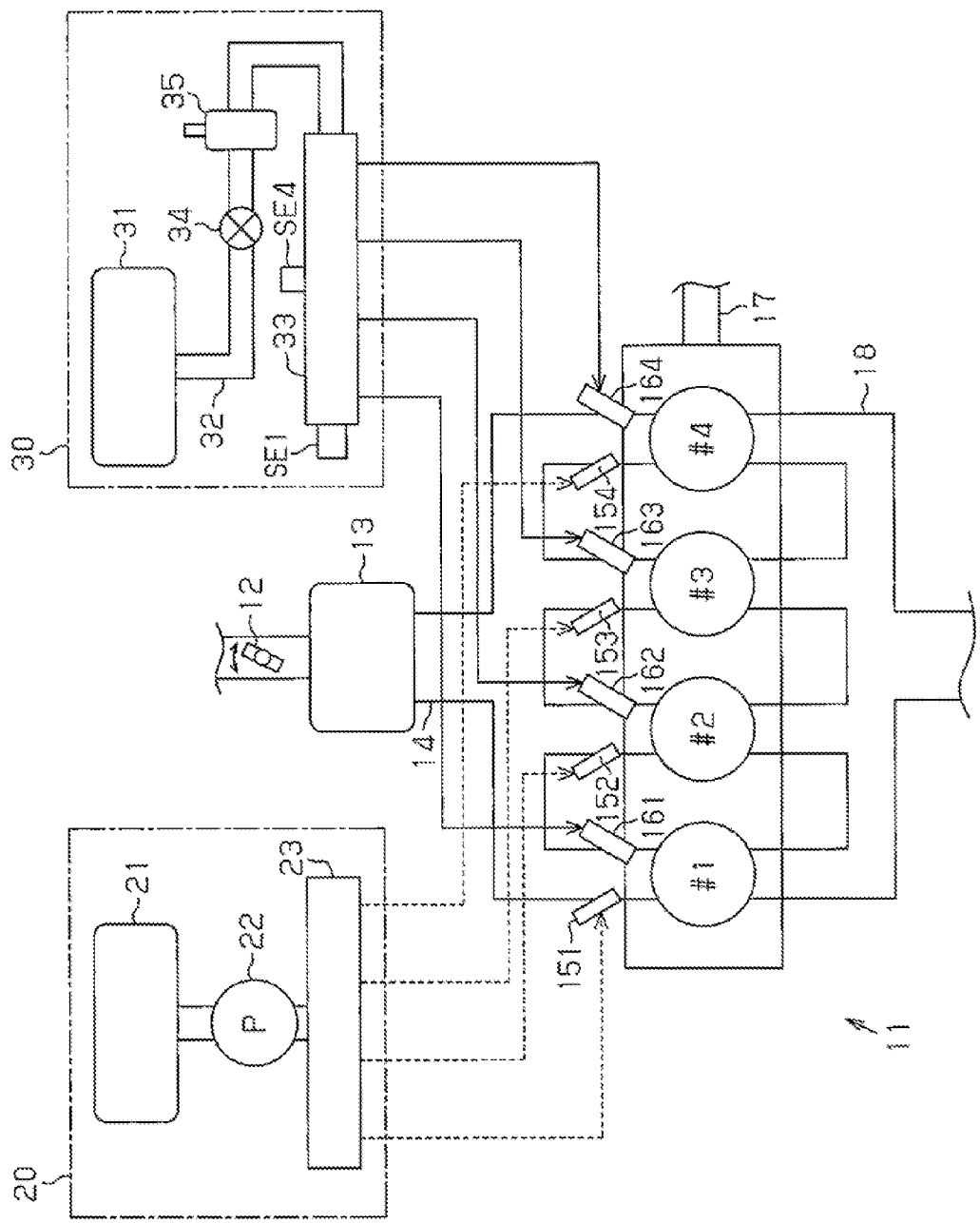
FIG. 1 is a schematic diagram showing an entire construction of a fuel supply control device for a bi-fuel internal combustion engine according to a first embodiment of the present invention.

As shown in FIG. 1, the bi-fuel internal combustion engine 11 uses gasoline as a liquid fuel and CNG (compressed natural gas) as a gas fuel. The bi-fuel internal combustion engine 11 includes four cylinders #1, #2, #3, and #4. In an intake passage communicatively connected to each cylinder, an air cleaner (not illustrated), a throttle valve 12, and a surge tank 13, etc., are provided. The air cleaner, the throttle valve 12, and the surge tank 13 are disposed in order from the upstream side to the downstream side of the intake air flow. On the downstream side of the surge tank 13, an intake manifold 14 is provided. The intake manifold 14 divides intake air inside the intake passage for each of the cylinders #1, #2, #3, and #4.

The intake manifold 14 is branched to four branch passages to suck in the intake air into each cylinder #1, #2, #3, and #4. In the branch passages, gasoline injection valves 151, 152, 153, and 154 that inject gasoline and CNG injection valves 161, 162, 163, and 164 that inject CNG are provided. Inside the cylinders #1, #2, #3, and #4, air-fuel mixture containing gasoline or CNG and the intake air is burned. Then, inside the cylinders #1, #2, #3, and #4, pistons not illustrated move reciprocatingly. By a force based on the reciprocating motions of the pistons, the crankshaft 17 rotates in a predetermined direction. Exhaust air generated in the cylinders #1, #2, #3, and #4 is discharged through an exhaust passage including an exhaust manifold 18.

The bi-fuel internal combustion engine 11 includes a gasoline supply system 20 and a CNG supply system 30. The gasoline supply system 20 supplies gasoline to the gasoline injection valves 151 to 154, and the CNG supply system 30 supplies CNG to the CNG injection valves 161 to 164. In the gasoline supply system 20, a fuel pump 22 and a gasoline delivery pipe 23 are provided. The fuel pump 22 suctions gasoline from the inside of the gasoline tank 21, and the gasoline dispensed from the fuel pump 22 is pressure-fed inside the gasoline delivery pipe 23. To the gasoline injection valves 151 to 154, gasoline is supplied from the gasoline delivery pipe 23.

In the CNG supply system 30, a high-pressure fuel piping 32 to be connected to a CNG tank 31, and a CNG delivery pipe 33 to be connected to the downstream end of the high-pressure fuel pipe 32 are provided. In the high-pressure fuel piping 32, a shutoff valve 34 and a regulator 35 disposed on the downstream side of the shutoff valve 34 are provided. The shutoff valve 34 opens for engine operation using CNG, on the other hand, it is closed for engine operation using gasoline. The regulator 35 operates to supply the CNG at a prescribed fuel pressure to the CNG delivery pipe 33.

In the CNG delivery pipe 33, a pressure sensor SE1 for detecting a fuel pressure inside the CNG delivery pipe 33 and a temperature sensor SE4 for detecting a fuel temperature inside the CNG delivery pipe 33 are provided. To the CNG injection valves 161 to 164, CNG is supplied from the CNG delivery pipe 33.

Next, the construction of the CNG injection valves 161 to 164 is described with reference to FIG. 2. In description of the CNG injection valves, the direction of the axis 41 of the CNG injection valves is defined as an up-down direction.

Figure 2:
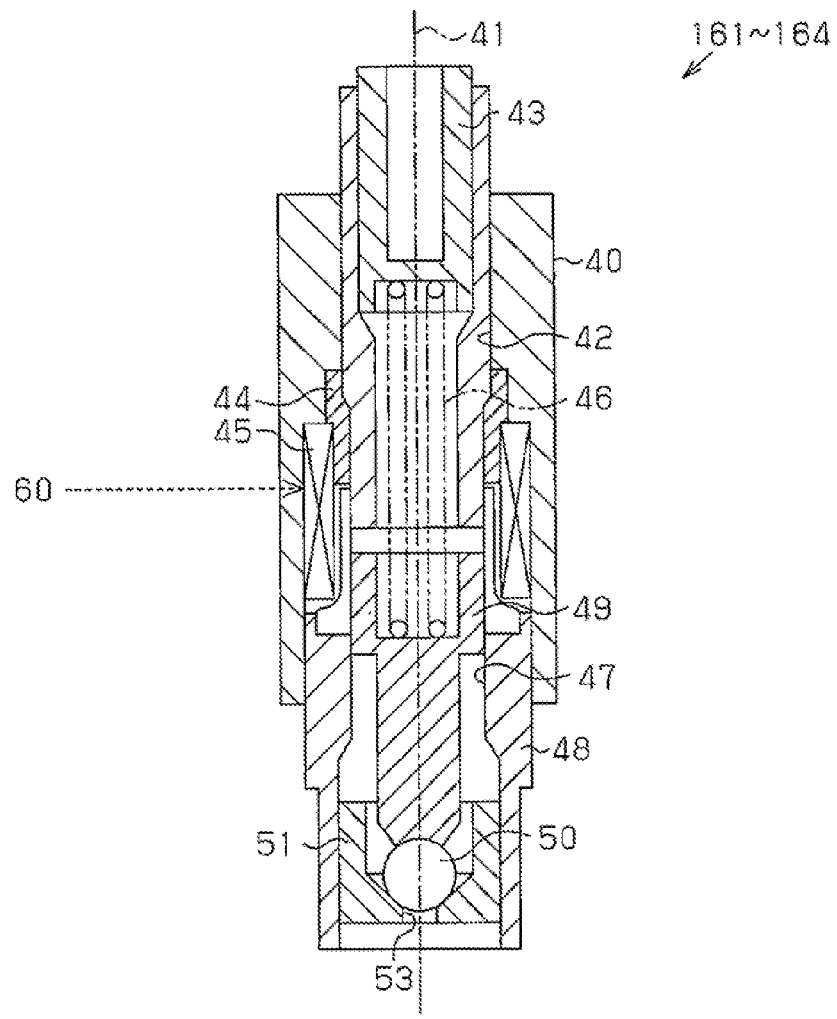
FIG. 2 is a sectional diagram of a CNG injection valve.

As shown in FIG. 2, the CNG injection valves 161 to 164 are normally-closed solenoid valves each of which includes a main body housing 40 in a substantially cylindrical shape. On the upper end of the main body housing 40, a closing member 43 is provided. The closing member 43 closes a through hole 42 of the main body housing 40. At the intermediate portion inside the through hole 42, a bobbin 44 and a solenoid coil 45 coiled on the outer periphery side of the bobbin 44 are provided. On the inner periphery side of the bobbin 44, a spring 46 supported by the closing member 43 is provided. The spring 46 is expandable along the axial direction.

On the lower end of the main body housing 40, a valve body 48 is provided. The valve body 48 has a housing hole 47 coaxially with the through hole 42. The upper end of the valve body 48 is positioned inside the through hole 42, and the lower end of the valve body 48 is positioned to be lower than the lower end of the main body housing 40.

The valve body 48 supports a movable iron core 49. The movable iron core 49 slides in the axial direction inside the housing hole 47. The spring 46 biases the movable iron core 49 downward. When electric power is supplied to the solenoid coil 45, the movable iron core 49 moves upward against the biasing force of the spring 46 according to an electromagnetic force generated by the solenoid coil 45.

Inside the housing hole 47, a valving element 50 that moves together with the movable iron core 49 and a valve seat 51 are provided. The valve seat 51 is disposed so as to close the lower opening end of the housing hole 47. On the valve seat 51, an injection port 53 is provided. When electric power is not supplied to the solenoid coil 45, the injection port 53 is closed by the valving element 50. As a result, from the CNG injection valves 161 to 164, CNG is not injected. On the other hand, when electric power is supplied to the solenoid coil 45, according to an electromagnetic force generated by the solenoid coil 45, the movable iron core 49 and the valving element 50 move and separate from the valve seat 51. Accordingly, the injection port 53 is opened. As a result, CNG supplied from an unillustrated inlet to the inside of the CNG injection valves 161 to 164 is injected from the injection port 53.

Next, a control device that controls fuel supply in the bi-fuel internal combustion engine 11 is described with reference to FIG. 3.

Figure 3:
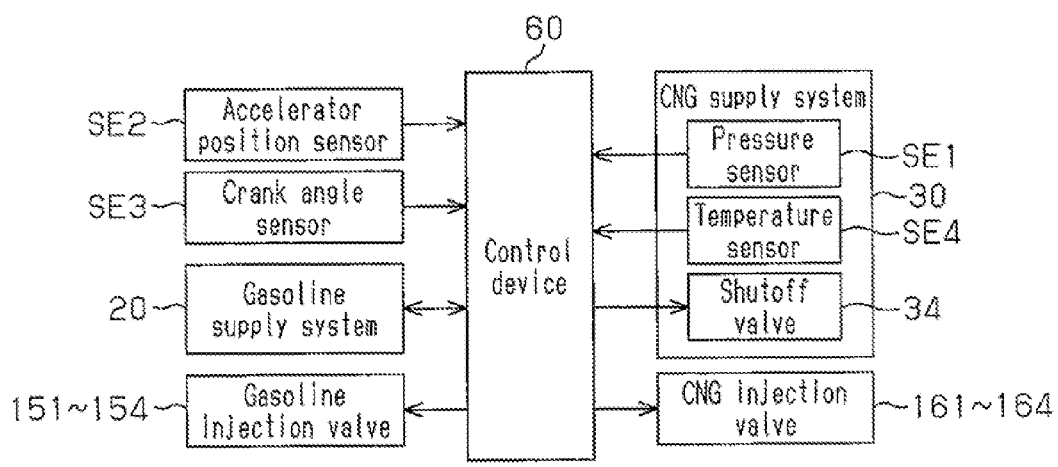
FIG. 3 is a block diagram showing a control structure of the bi-fuel internal combustion engine.

As shown in FIG. 3, to the control device 60 as a fuel supply control device, a pressure sensor SE1 and a temperature sensor SE4 are connected. The pressure sensor SE1 detects a fuel pressure inside the CNG delivery pipe 33, and the temperature sensor SE4 detects a fuel temperature inside the CNG delivery pipe 33. To the control device 60, an accelerator position sensor SE2 and a crank angle sensor SE3 are connected. The accelerator position sensor SE2 detects an operation amount of an unillustrated accelerator pedal operated by a driver, and the crank angle sensor SE3 detects a rotation speed of the crankshaft 17. To the control device 60, a gasoline supply system 20 (in detail, a fuel pump 22, etc.), the shutoff valve 34 of the CNG supply system 30, the gasoline injection valves 151 to 154, and the CNG injection valves 161 to 164, etc., are connected.

The control device 60 includes a digital computer consisting of a CPU, a ROM, a RAM, and a nonvolatile memory not illustrated. In the ROM, various control programs, etc., to be executed by the CPU are stored. In the RAM, information is temporarily stored. Information stored in the RAM is properly rewritten as long as an unillustrated ignition switch of the vehicle is on. In the nonvolatile memory, information that is not erased even after the ignition switch is turned off is stored.

To start the bi-fuel internal combustion engine 11, when the ignition switch is turned on, gasoline is supplied to the cylinders #1, #2, #3, and #4. Then, a switching condition is satisfied during engine operation using gasoline, the fuel to be used for engine operation is switched from gasoline to CNG.

However, CNG inside the CNG tank 31 contains impurities such as misty oil mixed in the process of adjusting the pressure of the CNG to be high. Therefore, when CNG supplied from the CNG supply system 30 is injected from the CNG injection valves 161 to 164, a part of the oil contained in the CNG adheres to the valving elements 50 and the valve seats 51, etc., forming the CNG injection vales 161 to 164. The lower the temperature, the higher the viscosity of the adhering oil. The bi-fuel internal combustion engine 11 may be installed in an environment at an extremely low temperature of, for example, "−30° C. or lower." In this case, oil adhering to the CNG injection valves 161 to 164 is solidified or the viscosity of the oil increases and the CNG injection valves 161 to 164 do not normally open. Accordingly, a proper amount of CNG cannot be supplied to the cylinders #1, #2, #3, and #4. Therefore, in this state, even if the bi-fuel internal combustion engine 11 is started, the fuel to be used for engine operation cannot be smoothly switched from gasoline to CNG.

Therefore, in the first embodiment, during engine operation using gasoline, judgment as to whether or not CNG can be normally injected from the CNG injection valves 161 to 164 is performed for each CNG injection valve. In detail, as shown in the timing chart of FIG. 5, in one cycle of the bi-fuel internal combustion engine 11, CNG is supplied to only one cylinder (for example, cylinder #1) as a judgment object, and gasoline is supplied to other cylinders (for example, cylinders #2, #3, and #4). In this state, whether or not CNG can be supplied to the cylinder serving as a judgment object is judged (judging process).

"One cycle" is a period until completion of the fuel supply to all cylinders #1, #2, #3, and #4. Specifically, in the bi-fuel internal combustion engine 11 having four cylinders, four cycles are needed to complete the judging process for all cylinders #1, #2, #3, and #4. In the first embodiment, fuel is supplied in the order of the cylinder #1, the cylinder #3, the cylinder #4, and the cylinder #2.

In the case where all injection valves 161 to 164 could normally inject CNG, it is judged that CNG can be supplied to all cylinders #1, #2, #3, and #4. As a result, the fuel to be used for engine operation is switched from gasoline to CNG. On the other hand, when at least one CNG injection valve cannot normally inject CNG, it is judged that CNG cannot be supplied to at least one cylinder. As a result, switching of the fuel to be used for engine operation from gasoline to CNG is prohibited, and the engine operation using gasoline is continued.

Figure 4:
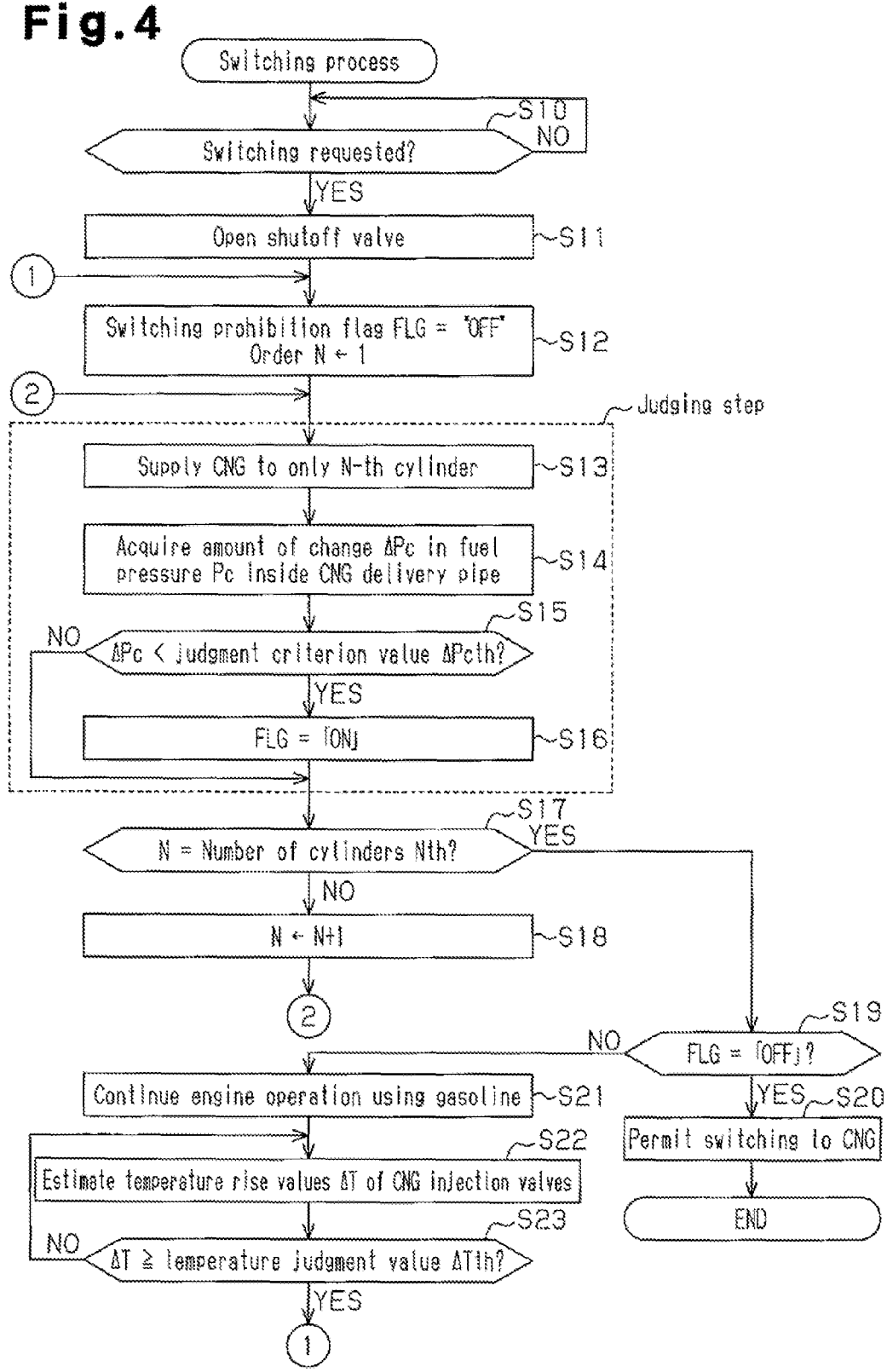
FIG. 4 is a flowchart describing a switching process routine.

Next, a switching judging process routine to be executed by the control device 60 is described with reference to the flowchart shown in FIG. 4.

First, the control device 60 judges whether or not switching of the fuel to be used for engine operation from gasoline to CNG is requested (Step S10). When switching is not requested (Step S10: NO), the control device 60 temporarily ends the switching judging process routine. On the other hand, when switching is requested (Step S10: YES), the control device 60 shifts the process to the next step S11.

Switching from gasoline to CNG is requested when an occupant of the vehicle performs a button operation. Switching is also requested when the switching condition is satisfied, that is, in detail, when the engine output at the current time is equal to or less than a maximum engine output in engine operation using CNG.

In Step S11, the control device 60 opens the shutoff valve 34 of the CNG supply system 30. Accordingly, CNG adjusted to a prescribed fuel pressure Pb (refer to FIG. 5) is supplied to the inside of the CNG delivery pipe 33. Then, the control device 60 sets a switching prohibition flag FLG to "OFF," and sets "1" as the order N (Step S12). This switching prohibition flag FLG is set to "OFF" when switching of the fuel to be used for engine operation from gasoline to CNG is permitted, and is set to "ON" when switching is prohibited.

Subsequently, the control device 60 sets the N-th cylinder (for example, cylinder #1) as a judgment object. The control device 60 supplies experimentally CNG to only one cylinder serving as a judgment object, and supplies gasoline to other cylinders (for example, cylinders #2, #3, and #4) (Step S13). For example, when the order N is "1," the cylinder serving as a judgment object is the cylinder #1, and when the order N is "2," the cylinder serving as a judgment object is the cylinder #3. Also, when the order N is "3," the cylinder serving as a judgment object is the cylinder #4, and when the order N is "4," the cylinder serving as a judgment object is the cylinder #2.

The control device 60 acquires an amount of change $\Delta Pc$ in fuel pressure Pc inside the CNG delivery pipe 33 accompanying supply of the CNG to the N-th cylinder (Step S14). In detail, the control device 60 regards a difference between a fuel pressure Pc (=Pb) before CNG injection by the CNG injection valve corresponding to the N-th cylinder (for example, CNG injection valve 161) and a lowest value of the fuel pressure Pc after the CNG injection as an amount of change $\Delta Pc$.

The amount of change $\Delta Pc$ in fuel pressure Pc fluctuates when the CNG inside the CNG delivery pipe 33 is used by CNG injection from the CNG injection valve. Therefore, as the CNG injection amount from the CNG injection valve becomes larger, the amount of change $\Delta Pc$ becomes larger. In other words, when the CNG cannot be injected from the CNG injection valve, the amount of change $\Delta Pc$ does not change. Therefore, the amount of change $\Delta Pc$ in fuel pressure Pc corresponds to a fuel parameter that fluctuates according to supply of the CNG to the cylinder.

Subsequently, the control device 60 judges whether or not the acquired amount of change $\Delta Pc$ is less than a judgment criterion value $\Delta Pcth$ (Step S15). The judgment criterion value $\Delta Pcth$ is set as a judgment criterion for judging whether or not CNG can be injected. The judgment criterion value $\Delta Pcth$ may be a criterion value set in advance, or may be set according to a current engine output.

When the amount of change $\Delta Pc$ is less than the judgment criterion value $\Delta Pcth$ (Step S15: YES), the control device 60 judges that a proper amount of CNG could not be supplied to the N-th cylinder. Therefore, the control device 60 sets the switching prohibition flag FLG to "ON" (Step S16), and shifts this process to the next Step S17. On the other hand, when the amount of change $\Delta Pc$ is equal to or more than the judgment criterion value $\Delta Pcth$ (Step S15: NO), the control device 60 judges that a proper amount of CNG can be supplied to the N-th cylinder. Therefore, the control device 60 shifts the process to the next step S17 without performing the process of Step S16. Therefore, Steps S13 to S16 constitute the judging step. In the judging step, whether or not CNG can be supplied to a cylinder serving as a judgment object is judged based on the amount of change $\Delta Pc$ in fuel pressure Pc.

In Step S17, the control device 60 judges whether or not the order N equals the number of cylinders Nth (in this case, 4). When the order N is less than the number of cylinders Nth (Step S17: NO), the control device 60 judges that there is a cylinder for which the judging process to judge whether or not CNG can be supplied has not been performed. Therefore, the control device 60 increments the order N by "1" (Step S18), and shifts the process to the above-described Step S13.

On the other hand, when the order N equals the number of cylinders Nth (Step S17: YES), the control device 60 judges that the judging process to judge whether or not CNG can be supplied to all cylinders was performed. Therefore, the control device 60 judges whether or not the switching prohibition flag FLG is "OFF" (Step S19). When the switching prohibition flag FLG is "OFF" (Step S19: YES), the control device 60 judges that CNG can be supplied to all cylinders. Therefore, the control device 60 permits switching of the fuel to be used for engine operation from gasoline to CNG (Step S20), and thereafter, ends the switching judging process routine. Therefore, Step S20 corresponds to the switching step. In the switching step, when it is judged that CNG can be supplied to all cylinders #1, #2, #3, and #4, the fuel to be used for engine operation is switched from the liquid fuel to the gas fuel.

On the other hand, when the switching prohibition flag FLG is "ON" (Step S19: NO), the control device 60 judges that there is a cylinder to which CNG cannot be supplied. Therefore, the control device 60 continues the engine operation using gasoline (Step S21). Subsequently, the control device 60 estimates temperature rise values $\Delta T$ of the CNG injection valves 161 to 164 after the judging process of Step S19 is performed (Step S22). The temperature rise value $\Delta T$ is an estimated value based on a fuel temperature inside the CNG delivery pipe 33, etc. The fuel temperature inside the CNG delivery pipe 33 is detected based on an engine operation state (for example, gasoline injection amount) after the judging process of Step S19 and a detection signal from the temperature sensor SE4. As another example, it is also possible that temperature sensors for detecting temperatures of the CNG injection valves 161 to 164 are provided, and the temperature rise values $\Delta T$ are calculated by using the temperature sensors.

The reason why CNG cannot be supplied to the cylinders is solidification of oil adhering to the CNG injection valves 161 to 164. Viscosities of oil adhering to the CNG injection valves 161 to 164 lower according to temperature rises of the CNG injection valves 161 to 164. Therefore, the temperature rise values $\Delta T$ of the CNG injection valves 161 to 164 correspond to viscosity parameters from which the degrees of lowering of viscosities of oil adhering to the CNG injection valves 161 to 164 can be estimated.

Subsequently, the control device 60 judges whether or not the temperature rise values $\Delta T$ estimated in Step S22 are equal to or more than a temperature judgment value $\Delta Tth$ (for example, 5° C.) (Step S23). The temperature judgment value $\Delta Tth$ is a prescribed value set in advance. The temperature judgment value $\Delta Th$ is a judgment criterion value for judging whether or not thermal energy necessary for eliminating solidification of oil adhering to the CNG injection valves 161 to 164 was applied to the oil.

When the temperature rise value $\Delta T$ is less than the temperature judgment value $\Delta Tth$ (Step S23: NO), the control device 60 judges that there is a possibility that the situation where CNG cannot be supplied continues. Therefore, the control device 60 shifts the process to the above-described Step S22. On the other hand, when the temperature rise value $\Delta T$ is equal to or more than the temperature judgment value $\Delta Tth$ (Step S23: YES), the control device 60 judges that there is a possibility that it has become possible to supply CNG to the cylinder. Therefore, the control device 60 shifts the process to the above-described step S12.

The judging process to judge whether or not CNG can be supplied to the cylinders #1, #2, #3, and #4 is performed for each cylinder. When it is judged that CNG cannot be supplied to at least one cylinder, the engine operation using gasoline is continued. In this state, when the re-judgment permission condition is satisfied, that is, in detail, when the temperatures of the CNG injection valves 161 to 164 rise by amounts equal to or more than the temperature judgment value ΔTth, the judging process is performed again for each of all cylinders #1, #2, #3, and #4. Then, after the re-judgment permission condition is satisfied, when it is judged that CNG can be supplied to all cylinders #1, #2, #3, and #4, the fuel to be used for engine operation is switched from gasoline to CNG. On the other hand, when it is judged that CNG cannot be supplied to at least one cylinder, the engine operation using gasoline is continued.

Figure 5:
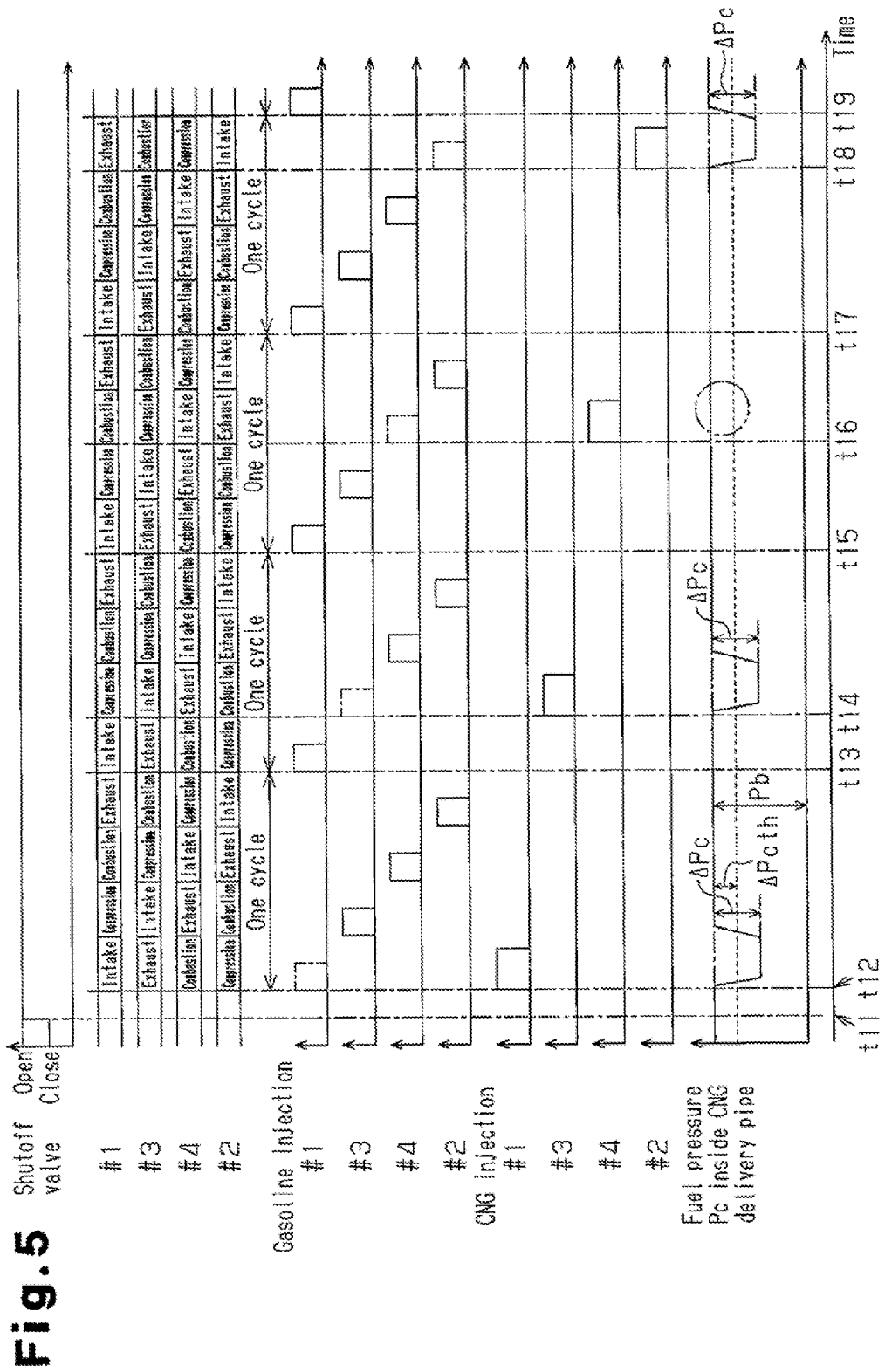
FIG. 5 is a timing chart showing a judging process to be performed for each cylinder.

Next, an operation for switching the fuel to be used for engine operation from gasoline to CNG during engine operation using gasoline is described with reference to the timing chart shown in FIG. 5. Here, it is assumed that oil adhering to the CNG injection valve 164 corresponding to the cylinder #4 is solidified, so that the CNG cannot be supplied to the cylinder #3 by using the CNG injection valve 164.

First, when switching is requested, the shutoff valve 34 opens (first timing t11). Then, CNG adjusted to a prescribed fuel pressure Pb is supplied to the CNG delivery pipe 33. Therefore, the fuel pressure Pc inside the CNG delivery pipe 33 is almost equal to the prescribed fuel pressure Pb.

In this state, the judging process to judge whether or not the CNG can be supplied to the cylinder is performed for each cylinder. In the first cycle, the cylinder #1 is a judgment object. Therefore, in the intake stroke of the cylinder #1, CNG is injected experimentally from the CNG injection valve 161 corresponding to the cylinder #1 (second timing t12). At this time, gasoline is not injected from the gasoline injection valve 151 corresponding to the cylinder #1. When the CNG injection valve 161 normally operates, the fuel pressure Pc inside the CNG delivery pipe 33 is reduced according to the operation state (for example, valve opening time) of the CNG injection valve 161. At this time, the amount of change ΔPc in fuel pressure Pc is equal to or more than the judgment criterion value ΔPcth, so that it is judged that the CNG can be supplied to the cylinder #1. In one cycle from the first timing t11 to the third timing t13 at which the intake stroke of the cylinder #2 ends, gasoline is supplied to the cylinders #2, #3, and #4 other than the cylinder #1 in their intake strokes.

In the next one cycle starting from the third timing t13, the judgment object is changed from the cylinder #1 to the cylinder #3. Therefore, in the intake stroke of the cylinder #3, CNG is injected experimentally from the CNG injection valve 163 corresponding to the cylinder #3 (fourth timing t14). At this time, gasoline is not injected from the gasoline injection valve 153 corresponding to the cylinder #3. When the CNG injection valve 163 normally operates, the fuel pressure Pc inside the CNG delivery pipe 33 is reduced according to an operation state of the CNG injection valve 163. At this time, the amount of change ΔPc in fuel pressure Pc is equal to or more than the judgment criterion value ΔPcth, so that it is judged that CNG can be supplied to the cylinder #3. In one cycle from the third timing t13 to the fifth timing t15 at which the intake stroke of the cylinder #2 ends, gasoline is supplied to the cylinders #1, #2, and #4 other than the cylinder #3 in their intake strokes.

Then, in the next one cycle starting from the fifth timing t15, the judgment object is changed from the cylinder #3 to the cylinder #4. Therefore, in the intake stroke of the cylinder #4, CNG is injected experimentally from the CNG injection valve 164 corresponding to the cylinder #4 (sixth timing t16). At this time, gasoline is not injected from the gasoline injection valve 154 corresponding to the cylinder #4. However, the CNG injection valve 164 does not normally operate, so that CNG is not injected from the CNG injection valve 164, either. Therefore, as shown by the alternate long and two short dashed line in FIG. 5, the fuel pressure Pc inside the CNG delivery pipe 33 becomes constant. In this case, as a matter of course, the amount of change ΔPc in fuel pressure Pc is less than the judgment criterion value ΔPcth. As a result, it is judged that CNG cannot be supplied to the cylinder #4.

When the fuel (CNG) cannot be supplied in the intake stroke of the cylinder #4, a proper force corresponding to a required output is not transmitted to the crankshaft 17 in a combustion stroke of the cylinder #4. However, in one cycle from the fifth timing t15 to the seventh timing t17 at which the intake stroke of the cylinder #2 ends, gasoline is supplied to the cylinders #1, #2, and #3 other than the cylinder #4 in their intake strokes. Specifically, in each combustion stroke of the cylinders #1, #2, and #3 other than the cylinder #4, an air-fuel mixture containing gasoline is burned. Therefore, a proper force corresponding to a required output is transmitted to the crankshaft 17, and the operation of the bi-fuel internal combustion engine 11 is continued. Specifically, even when one cylinder #4 does not generate a force, other cylinders #1, #2, and #3 generate a force, so that the operation of the bi-fuel internal combustion engine 11 does not stop.

Then, in the next one cycle starting from the seventh timing t17, the judgment object is changed from the cylinder #4 to the cylinder #2. Therefore, in the intake stroke of the cylinder #2, CNG is injected experimentally from the CNG injection valve 162 corresponding to the cylinder #2 (eighth timing t18). At this time, gasoline is not injected from the gasoline injection valve 152 corresponding to the cylinder #2. When the CNG injection valve 162 normally operates, the fuel pressure Pc inside the CNG delivery pipe 33 is reduced according to the operation state of the CNG injection valve 162. At this time, the amount of change ΔPc in fuel pressure Pc is equal to or more than the judgment criterion value ΔPcth, so that it is judged that CNG can be supplied to the cylinder #2. In one cycle from the seventh timing t17 to the eighth timing t18 at which the intake stroke of the cylinder #2 ends, gasoline is supplied to the cylinders #1, #3, and #4 other than the cylinder #2 in their intake strokes.

As a result of the above-described series of judging processes, it is judged that there is a cylinder (cylinder #4) to which CNG cannot be supplied, so that from the ninth timing t19, the engine operation using gasoline is continued. After the ninth timing t19, when the temperature rise values ΔT of the CNG injection valves 161 to 164 become equal to or more than the temperature judgment value ΔTth, the above-described judging process is performed again. During the engine operation using gasoline, at least a part of thermal energy according to engine operation is transmitted to the CNG injection valves 161 to 164 (in this case, CNG injection valve 164 in particular). Then, the temperature of the CNG injection valve 163 rises, and the viscosity of oil adhering to the CNG injection valve 163 lowers. Then, when the viscosity of the oil lowers to the degree that causes no problem to open the CNG injection valve 163, injection of CNG from the CNG injection valve 163 becomes possible.

In this state, the judging process is performed again for each of all cylinders #1, #2, #3, and #4. Then, it is judged that CNG can be supplied to all cylinders including the cylinder #4 to which it is judged that CNG cannot be supplied in the previous judging process. As a result, the fuel to be used for engine operation is switched from gasoline to CNG.

According to the first embodiment described above, the following effects can be obtained.

(1) During engine operation using gasoline, CNG is supplied experimentally to one cylinder serving as a judgment object, and gasoline is supplied to other cylinders. In this state, whether or not CNG can be supplied to the cylinder serving as a judgment object is judged. Therefore, the accuracy of judgment as to whether or not CNG can be supplied to the cylinder is improved to be higher than in the case where the judgment is made based on an outside air temperature.

(2) In one cycle, CNG is supplied experimentally to only one cylinder (for example, cylinder #1), and gasoline is supplied to other cylinders. Therefore, even if CNG cannot be supplied to the cylinder serving as a judgment object, a proper amount of gasoline is supplied to other cylinders. Therefore, even during the judging process, the operation of the bi-fuel internal combustion engine 11 can be continued.

(3) The judging process to judge whether or not CNG can be supplied to the cylinder is performed for each cylinder. Then, when it is judged that CNG can be supplied to all cylinders #1, #2, #3, and #4, the fuel to be used for engine operation is switched from gasoline to CNG. Therefore, as compared with the case where whether or not CNG can be supplied from each CNG injection valve 161 to 164 is estimated based on an outside air temperature, the fuel to be used for engine operation can be smoothly switched from gasoline to CNG.

(4) When it is judged that CNG cannot be supplied to at least one cylinder, engine operation using gasoline is continued. Specifically, when there is a cylinder to which CNG cannot be supplied or to which CNG may not be supplied, switching to engine operation using CNG can be restrained.

(5) After the judging process is performed for all cylinders #1, #2, #3, and #4, whether or not the fuel to be used for engine operation is to be switched from gasoline to CNG is judged. In the case where switching to CNG is prohibited, when the subsequent temperature rise values ΔT of the CNG injection valves 161 to 164 become equal to or more than the temperature judgment value ΔTth, the judging process is performed again. The reason why a certain time interval is provided before the next judging process is that when oil adhering to the CNG injection valves 161 to 164 is solidified and the CNG injection valves 161 to 164 cannot normally open, by raising the temperature of the oil, the viscosity of the oil lowers. Therefore, after the temperature rise values ΔT of the CNG injection valves 161 to 164 become equal to or more than the temperature judgment value ΔTth, the judging process is performed again. Accordingly, it becomes possible to properly inject CNG from the CNG injection valves 161 to 164 that did not normally open. Therefore, by repeating the judging process, switching to engine operation using CNG becomes possible.

(6) When it is judged that there is a cylinder to which CNG cannot be supplied, the engine operation using gasoline is continued. In this case, when the temperature rise values ΔT of the CNG injection valves 161 to 164 become equal to or more than the temperature judgment value ΔTth, the judging process is performed again for all cylinders #1, #2, #3, and #4. Accordingly, the accuracy of judgment as to whether or not the gas fuel can be supplied to all cylinders #1, #2, #3, and #4 becomes higher than in the case where the judging process is performed for only the cylinder to which it is judged that CNG cannot be supplied. Therefore, the possibility of smooth switching of the fuel to be used for engine operation from gasoline to CNG increases.

(7) The reason why CNG cannot be supplied to the cylinders is malfunction of the CNG injection valves 161 to 164 in addition to solidification of oil adhering to the CNG injection valves 161 to 164. Malfunction of the CNG injection valves 161 to 164 is not solved even if the outside air temperature rises. In the first embodiment, CNG is supplied to only one cylinder serving as a judgment object, and whether or not CNG can be supplied to the cylinder serving as a judgment object is judged. Therefore, even in the case where CNG cannot be supplied to the cylinder serving as a judgment object due to malfunction of the CNG injection valves 161 to 164, it can be judged that CNG cannot be supplied to the cylinder serving as a judgment object.

Next, a second embodiment of the present invention is described with reference to the flowchart shown in FIG. 6. The second embodiment is different from the first embodiment in that, in the case where engine operation using gasoline is continued since there is a cylinder to which it is judged that CNG cannot be supplied, the judging process is performed again for only the cylinder to which it is judged that CNG cannot be supplied. Therefore, detailed description of the same portions in the second embodiment as in the first embodiment is omitted.

Figure 6:
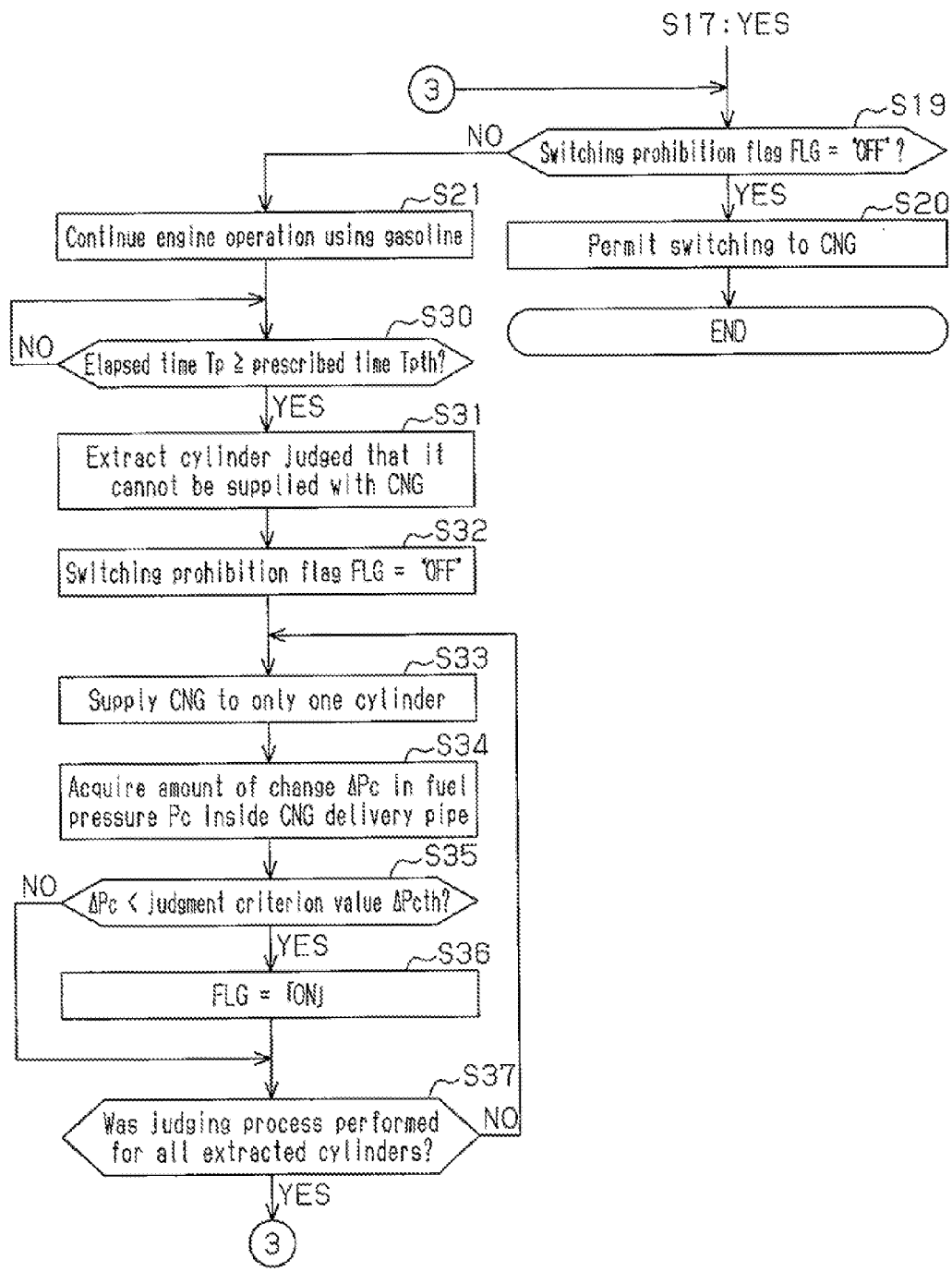
FIG. 6 is a flowchart describing a switching process routine according to a second embodiment of the present invention.

As shown in FIG. 6, the control device 60 performs each process of Step S10 to S18 in the switching judging process routine to judge whether or not CNG can be supplied to all cylinders #1, #2, #3, and #4. After the judging process, the control device 60 judges whether or not the switching prohibition flag FLG is "OFF" (Step S19). When the switching prohibition flag FLG is "OFF" (Step S19: YES), the control device 60 permits switching of the fuel to be used for engine operation from gasoline to CNG (Step S20) and ends the switching judging process routine.

On the other hand, when the switching prohibition flag FLG is "ON" (Step S19: NO), the control device 60 continues the engine operation using gasoline (Step S21). Subsequently, the control device 60 acquires an elapsed time (viscosity parameter) Tp from the judging process of Step S19. The control device 60 judges whether or not the elapsed time Tp is equal to or more than the prescribed time Tpth (Step S30). The prescribed time Tpth is a prescribed value set in advance. The elapsed time Tp is an elapsed time after switching to engine operation using CNG is prohibited according to the previous judging process. The prescribed time Tpth is a judgment criterion value for judging whether or not the temperatures of the CNG injection valves 161 to 164 have risen.

When the elapsed time Tp is less than the prescribed time Tpth (Step S30: NO), the control device 60 repeatedly performs the judging process of step S30 until the elapsed time Tp reaches the prescribed time Tpth. On the other hand, when the elapsed time Tp becomes equal to or more than the prescribed time Tpth (Step S30: YES), the control device 60 selects the cylinder to which it is judged that CNG cannot be supplied (for example, cylinder #4) (Step S31), and sets the switching prohibition flag FLG to "OFF" (Step S32).

Then, the control device 60 sets any one of the cylinders selected in Step S31 as a judgment object, and supplies CNG to only the cylinder serving as a judgment object and supplies gasoline to other cylinders (Step S33). Subsequently, the control device 60 performs each process of Steps S34 and S35 equivalent to each process of the Steps S14 and S15 in order. When the amount of change ΔPc in fuel pressure Pc inside the CNG delivery pipe 33 is less than the judgment criterion value ΔPcth (Step S35: YES), the control device 60 judges that there is a possibility that CNG still cannot be or has not been supplied to the cylinder serving as a judgment object. Therefore, the control device 60 sets the switching prohibition flag FLG to "ON" (Step S36), and shifts the process to Step S37 described later. On the other hand, when the amount of change $\Delta Pc$ is equal to or more than the judgment criterion value $\Delta Pcth$ (Step S35: NO), the control device 60 judges that CNG can be supplied to the cylinder serving as a judgment object. Therefore, the control device 60 shifts the process to the next step S37 without performing the process of Step S36.

In Step S37, the control device 60 judges whether or not the judging process was performed for all cylinders selected in Step S31. When there is a cylinder for which the judging process is still not being performed (Step S37: NO), the control device 60 shifts the process to the above-described Step S33. Then, the control device 60 sets a cylinder (for example, cylinder #2) different from the cylinder (for example, cylinder #4) set as a judgment object in the previous Step S33 as a judgment object, and performs each process of Step S33 and S34 in order. On the other hand, in the case where the judging process is performed for all selected cylinders (Step S37: YES), the control device 60 shifts the process to the above-described Step S19.

In the second embodiment, the judging process is performed for each of all cylinders #1, #2, #3, and #4. Then, when it is judged that CNG cannot be supplied to at least one cylinder, the engine operation using gasoline is continued. In this state, whether or not the elapsed time Tp after switching to CNG is prohibited is equal to or more than the prescribed time Tpth is judged. When the re-judgment permission condition that the elapsed time Tp is equal to or more than the prescribed time Tpth is satisfied, a cylinder to which it is judged that CNG cannot be supplied is selected. Then, the judging process is performed again for only the selected cylinder. At this time, when a plurality of cylinders is selected, the judging process is performed for each of the cylinders in order.

When it is judged that CNG can be supplied to all selected cylinders, the fuel to be used for engine operation is switched from gasoline to CNG. On the other hand, when there is a cylinder to which the CNG cannot be supplied, the engine operation using gasoline is continued.

Therefore, in the second embodiment, in addition to the effects (1) to (4) and (7) of the first embodiment, the following effects can be obtained.

(8) After the judging process is performed for all cylinders #1, #2, #3, and #4, whether or not the fuel to be used for engine operation is to be switched from gasoline to CNG is judged. When the elapsed time Tp after switching to CNG is prohibited becomes equal to or more than the prescribed time Tpth, the judging process is performed again. The reason why a certain time interval is provided after switching to CNG is prohibited is as follows. That is, when oil adhering to the CNG injection valves 161 to 164 is solidified and the CNG injection valves 161 to 164 do not normally open, by raising the temperature of the oil adhering to the CNG injection valves 161 to 164, the viscosity of the oil lowers. Therefore, by performing the judging process again after the elapsed time Tp becomes equal to or more than the prescribed time Tpth, CNG can be properly injected from the CNG injection valves 161 to 164 that did not normally open. Therefore, by repeatedly performing the judging process, switching to engine operation using CNG can be performed.

(9) When it is judged that there is a cylinder to which CNG cannot be supplied, the engine operation using gasoline is continued. In this case, when the elapsed time Tp becomes equal to or more than the prescribed time Tpth, the judging process is performed again for only the cylinder to which it is judged that CNG cannot be supplied. Therefore, the time required for performing the judgment becomes shorter than in the case where the judging process is performed again for all cylinders. Therefore, the fuel to be used for engine operation can be quickly switched from gasoline to CNG.

Figure 7:
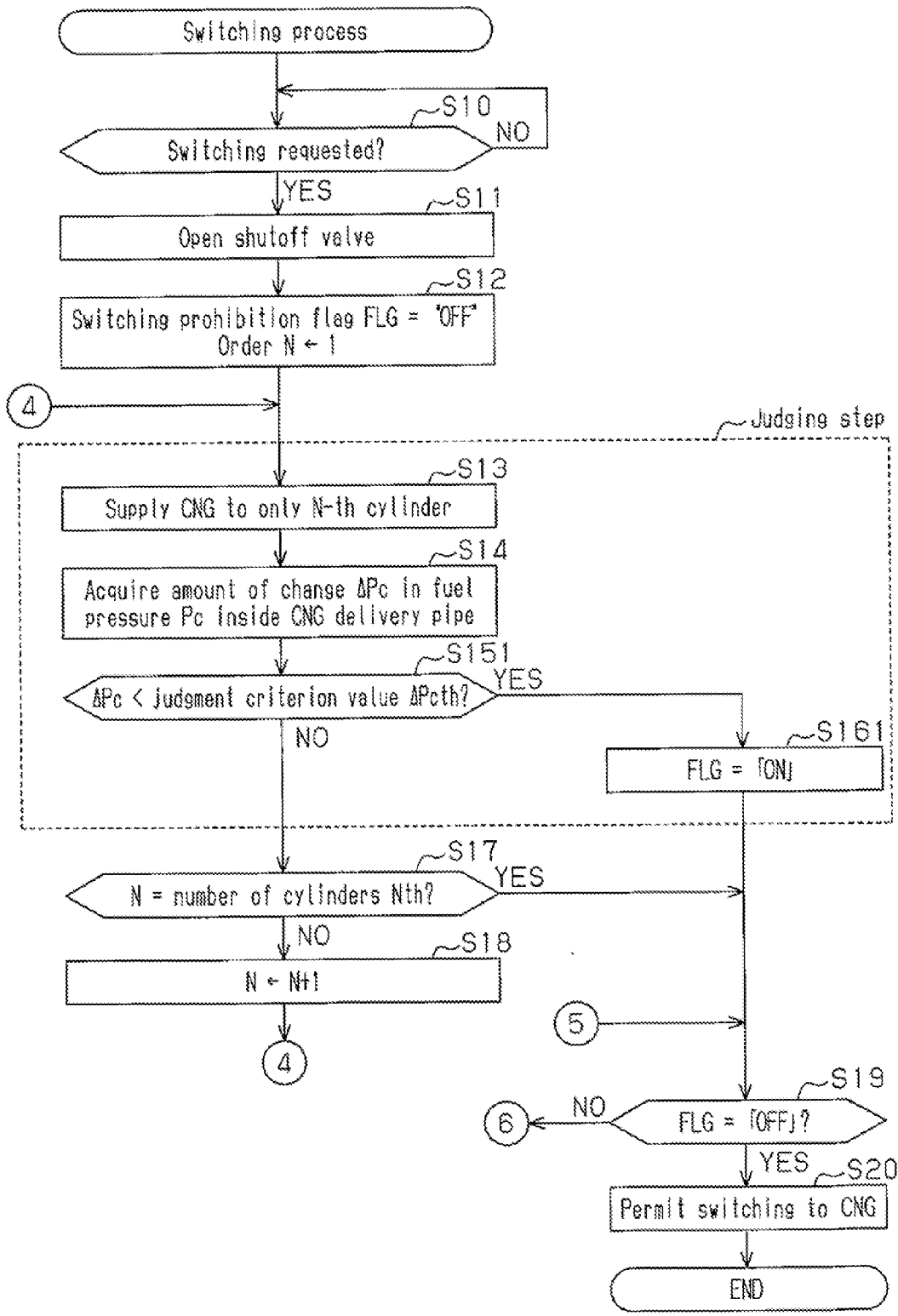
FIG. 7 is a flowchart describing a first half of a switching process routine according to a third embodiment of the present invention.
Figure 8:
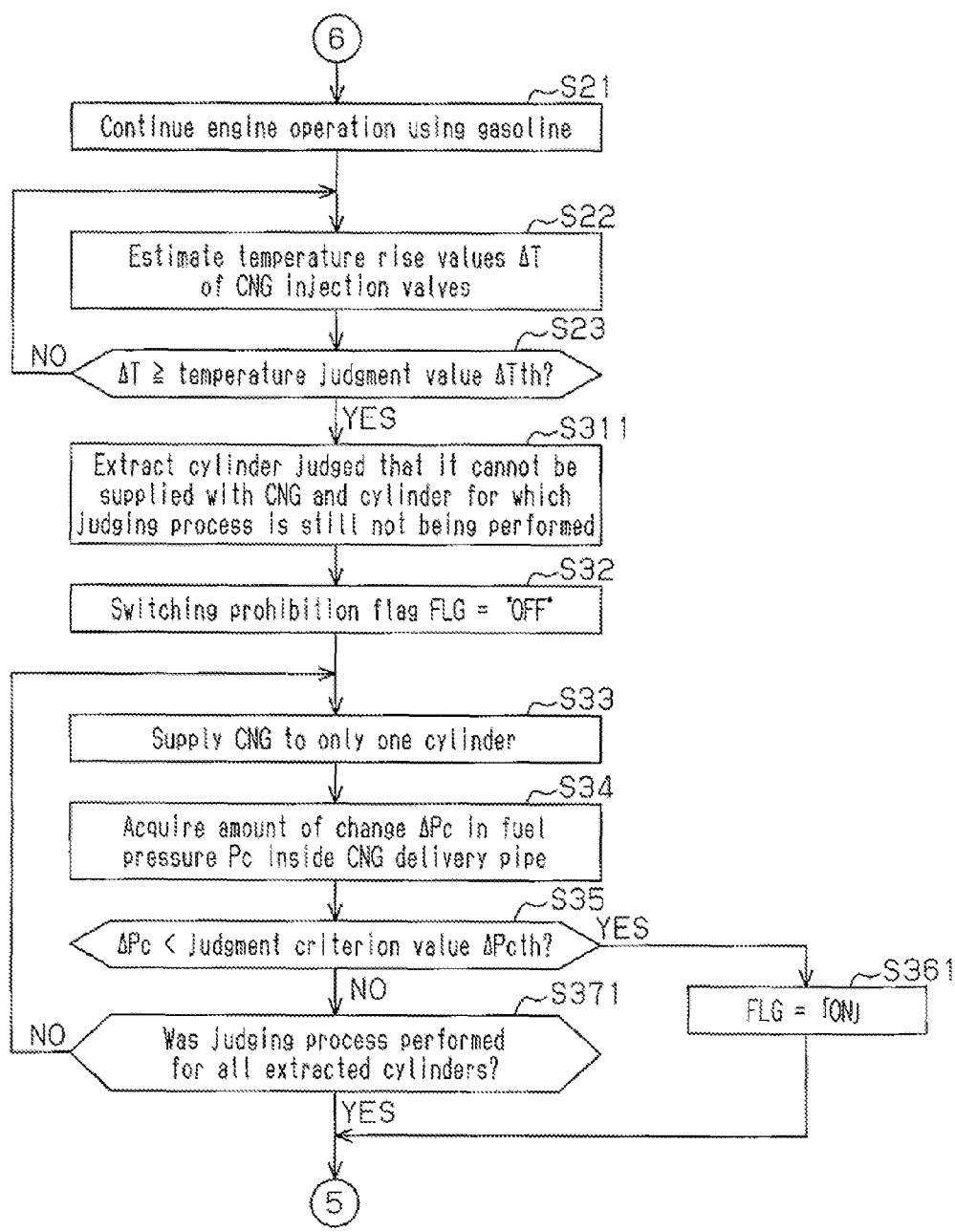
FIG. 8 is a flowchart describing a second half of the switching process routine.

Next, a third embodiment of the present invention is described with reference to the flowcharts shown in FIG. 7 and FIG. 8. The third embodiment is different from the first embodiment in that, at the time at which a cylinder to which it is judged that CNG cannot be supplied is detected, the judging process is not performed for remaining cylinders. Therefore, detailed description of the same portion in the third embodiment as in the first embodiment is omitted.

The control device 60 performs each process of Steps S10 to S14 in the switching judging process routine in order. Thereafter, the control device 60 judges whether or not the amount of change $\Delta Pc$ in fuel pressure Pc acquired in Step S14 is less than the judgment criterion value $\Delta Pcth$ (Step S151). When the amount of change $\Delta Pc$ is less than the judgment criterion value $\Delta Pcth$ (Step S151: YES), the control device 60 sets the switching prohibition flag FLG to "ON" (Step S161), and shifts the process to Step S19. Therefore, Steps S13, S14, S151, and S161 constitute the judging step.

On the other hand, when the amount of change $\Delta Pc$ is equal to or more than the judgment criterion value $\Delta Pcth$ (Step S151: NO), the control device 60 judges whether or not the order N has reached the number of cylinders Nth (Step S17). Then, when the order N reaches the number of cylinders Nth (Step S17: YES), the control device 60 shifts the process to Step S19. On the other hand, when the order N is less than the number of cylinders Nth (Step S17: NO), the control device 60 increments the order N by "1" (Step S18), and then shifts the process to Step S13.

In Step S19, the control device 60 judges whether or not the switching prohibition flag FLG is "OFF." When the switching prohibition flag FLG is "ON" (Step S19: NO), the control device 60 performs each process of Steps S21, S22, and S23 in order. Then, when the temperature rise values $\Delta T$ of the CNG injection valves 161 to 164 are equal to or more than the temperature judgment value $\Delta Tth$ (Step S23: YES), the control device 60 selects a cylinder to which it is judged that CNG cannot be supplied (for example, cylinder #4) and a cylinder for which the judging process was not performed (for example, cylinder #2) (Step S311). In the case where the judging process is performed at least once for all cylinders #1, #2, #3, and #4, only a cylinder to which it is judged that CNG cannot be supplied is selected.

Then, the control device 60 performs each process of Step S32, S33, S34, and S35 in order. Subsequently, when the amounts of change $\Delta Pc$ in fuel pressure Pc acquired in Step S34 are less than the judgment criterion value $\Delta Pcth$ (Step S35: YES), the control device 60 sets the switching prohibition flag FLG to "ON" (Step S361), and shifts the process to the above-described step S19. On the other hand, when the amounts of change $\Delta Pc$ are equal to or more than the judgment criterion value $\Delta Pcth$ (Step S35: NO), the control device 60 judges whether or not the judging process was performed for all cylinders selected in Step S311 (Step S371). When there is a cylinder for which the judging process is still not being performed (Step S371: NO), the control device 60 shifts the process to Step S33. On the other hand, when it is judged that the judging process was performed for all selected cylinders (Step S371: YES), the control device 60 shifts the process to Step S19.

In the third embodiment, when the judging process to judge whether or not CNG can be supplied to all cylinders #1, #2, #3, and #4 is performed, the following process is performed. That is, at the time at which a cylinder to which it is judged that CNG cannot be supplied is detected, even if there is a remaining cylinder for which the judging process is still not being performed, continuation of the engine operation using gasoline is determined without performing the judging process for the remaining cylinder. In this state, when the re-judgment permission condition that the temperatures of the CNG injection valves 161 to 164 rise by the temperature judgment value ΔTth or higher is satisfied, the judging process is performed for the cylinder to which it is judged that CNG cannot be supplied and the remaining cylinder for which the judging process was not performed. At this time, when there is a plurality of cylinders that may be judgment objects, the judging process is performed for each cylinder in order.

Then, when it is judged that CNG can be supplied to all selected cylinders, the control device 60 judges that it is possible to supply CNG to all cylinders #1, #2, #3, and #4. Therefore, the fuel to be used for engine operation is switched from gasoline to CNG. On the other hand, when a cylinder to which CNG cannot be supplied is included in all selected cylinders, the control device 60 determines continuation of the engine operation using gasoline without performing the judging process for the cylinder for which the judging process is still not being performed.

Therefore, according to the third embodiment, the following effects can be obtained in addition to the effects (1) to (5) and (7) of the first embodiment.

(10) When a cylinder to which it is judged that CNG cannot be supplied is detected, the control device 60 determines continuation of the engine operation using gasoline without performing the judging process for a remaining cylinder for which the judging process has not been performed. Therefore, the time required for the judgment becomes shorter than in the case where continuation of the engine operation using gasoline is determined after the judging process is performed for all cylinders #1, #2, #3, and #4.

(11) The judging process is performed again in the case where the engine operation using gasoline is continued since there is a cylinder to which it is judged that CNG cannot be supplied. In this case, the judging process is performed for only a cylinder to which it is judged that CNG cannot be supplied and a cylinder for which the judging process was not performed. Specifically, the judging process is not performed again for a cylinder already judged that it can be supplied with CNG, so that the time required for the judgment becomes shorter.

The above-described embodiments may be changed as follows.

In the third embodiment, when the judgment result of Step S23 is "YES," the process may be shifted to Step S12. Specifically, it is possible that continuation of the engine operation using gasoline is determined when a cylinder to which CNG cannot be supplied is detected, and thereafter, when the re-judgment permission condition is satisfied, the judging process is performed for each of all cylinders #1, #2, #3, and #4 including a cylinder judged that it can be supplied with CNG.

In the first and third embodiments, when it is judged that the switching prohibition flag FLG is "OFF" in Step S19, instead of each process of Steps S22 and S23, the process of Step S30 may be performed.

In the second embodiment, when it is judged that the switching prohibition flag FLG is "OFF" in Step S19, instead of the process of Step S30, each process of Steps S22 and S23 may be performed.

In each embodiment, in the case where it is possible to detect the fuel temperature inside the CNG delivery pipes 33, it is possible that a fuel temperature inside the CNG delivery pipe 33 is acquired as a viscosity parameter, and when the fuel temperature becomes equal to or higher than the prescribed temperature, it is judged that the re-judgment permission condition is satisfied.

In each embodiment, in the case where judgment that CNG cannot be supplied to one cylinder (for example, cylinder #3) is repeated a predetermined number of times successively (for example, 5 times), it may be judged that the CNG injection valve corresponding to the one cylinder has malfunctioned. When it is judged that at least one CNG injection valve has malfunctioned, the engine operation using gasoline may be continued without performing the judging process for any of the cylinders.

When the CNG injection valves 161 to 164 normally open, as the required output becomes larger, the fuel pressure Pc inside the CNG delivery pipe 33 is greatly reduced. Therefore, when the engine rotation speed becomes equal to or more than a prescribed rotation speed, the switching process routine may be performed. In this case, the fuel pressure Pc fluctuates more than in the case where the switching process routine is performed for idling, etc., for which the required output is small, and accordingly, the accuracy of judgment as to whether or not CNG can be supplied to the cylinders is improved.

In each embodiment, it is possible that CNG is supplied to only one cylinder serving as a judgment object, and when judging whether or not CNG can be supplied to the cylinder serving as a judgment object, instead of the amount of change ΔPc in fuel pressure Pc inside the CNG delivery pipe 33, the change in rotation speed of the crankshaft 17 may be used. This is because, when CNG cannot be supplied to the cylinder serving as a judgment object, the rotation speed of the crankshaft 17 becomes lower than in the case where CNG can be supplied to the cylinder serving as a judgment object. In this case, the rotation speed of the crankshaft 17 corresponds to the fuel parameter that fluctuates depending on whether or not CNG can be supplied.

In each embodiment, the gas fuel may be a gas fuel other than CNG (hydrogen gas, etc.). The gas fuel may be LPG (liquefied petroleum gas). For example, when the gas fuel is a hydrogen gas, gasoline is used as a liquid gas. When the gas fuel is dimethylether (DME), light oil is used as a liquid fuel.

In each embodiment, the bi-fuel internal combustion engine 11 may be embodied as an internal combustion engine having a plurality of cylinders the number of which is (for example, 3 or 6) other than 4.

The invention claimed is:

1. A fuel supply control device for a bi-fuel internal combustion engine having a plurality of cylinders in which a liquid fuel and a gas fuel can be used as a fuel to be used for engine operation, wherein
the fuel supply control device switches the fuel to be used for engine operation from the liquid fuel to the gas fuel,
the fuel supply control device includes a processor programmed with an algorithm so that the fuel supply control device judges whether or not the gas fuel can be supplied to one of the plurality of cylinders serving as a judgment object based on a fuel parameter that fluctuates according to supply of the gas fuel to the cylinder in a state where only the gas fuel is supplied experimentally to the cylinder serving as a judgment object without supplying with the liquid fuel and the liquid fuel is supplied to the other cylinders when switching the fuel from the liquid fuel to the gas fuel, and the fuel supply control device switches the fuel to be used for engine operation from the liquid fuel to the gas fuel when the fuel supply control device judges that the gas fuel can be supplied to all of the cylinders.

2. The fuel supply control device for a bi-fuel internal combustion engine according to claim 1, wherein when the fuel supply control device judges that there is a cylinder to which the gas fuel cannot be supplied, the fuel supply control device continues the engine operation using the liquid fuel.

3. The fuel supply control device for a bi-fuel internal combustion engine according to claim 2, wherein when the fuel supply control device judges that there is a cylinder to which the gas fuel cannot be supplied and continues the engine operation using the liquid fuel, the fuel supply control device acquires a viscosity parameter, and the viscosity parameter is a parameter from which the degree of lowering of viscosity of impurities adhering to an injection valve for gas injection can be estimated, and when a re-judgment permission condition based on the viscosity parameter is satisfied, the fuel supply control device performs the judging process again for at least the cylinder to which it is judged that the gas fuel cannot be supplied of all of the cylinders.

4. The fuel supply control device for a bi-fuel internal combustion engine according to claim 3, wherein when the re-judgment permission condition is satisfied, the fuel supply control device performs the judging process again for all of the cylinders.

5. The fuel supply control device for a bi-fuel internal combustion engine according to claim 3, wherein when the re-judgment permission condition is satisfied, the fuel supply control device performs the judging process again for only the cylinder to which it is judged that the gas fuel cannot be supplied.

6. The fuel supply control device for a bi-fuel internal combustion engine according to claim 2, wherein when a cylinder to which the gas fuel cannot be supplied is detected through the judging process performed, the fuel supply control device continues the engine operation using the liquid fuel without performing the judging process for other cylinders for which the judging process has not been performed.

7. The fuel supply control device for a bi-fuel internal combustion engine according to claim 6, wherein when the fuel supply control device judges that there is a cylinder to which the gas fuel cannot be supplied and continues the engine operation using the liquid fuel, the fuel supply control device acquires a viscosity parameter, and the viscosity parameter is a parameter from which the degree of lowering of viscosity of impurities adhering to the injection valve for gas injection can be estimated, and when a re-judgment permission condition based on the viscosity parameter is satisfied, the fuel supply control device performs the judging process for the cylinder to which it is judged that the gas fuel cannot be supplied in the previous judging process and a cylinder for which the judging process was not performed.

8. The fuel supply control device for a bi-fuel internal combustion engine according to claim 1, wherein the fuel parameter is a pressure inside a delivery pipe for supplying the gas fuel to an injection valve for the gas fuel, a rotation speed of a crankshaft of the bi-fuel internal combustion engine, or a temperature inside the delivery pipe for supplying the gas fuel to the injection valve.

9. The fuel supply control device for a bi-fuel internal combustion engine according to claim 3, wherein the viscosity parameter is a temperature rise value of the injection valve for the gas fuel after continuation of the engine operation using the liquid fuel is determined, an elapsed time after continuation of the engine operation using the liquid fuel is determined, or a temperature rise value inside a delivery pipe after continuation of the engine operation using the liquid fuel is determined.

10. A method for switching a fuel in a bi-fuel internal combustion engine arranged to switch a fuel to be used for engine operation from a liquid fuel to a gas fuel during operation of the bi-fuel internal combustion engine that uses the liquid fuel, comprising:

a judging step of judging whether or not the gas fuel can be supplied to a cylinder serving as a judgment object based on a fuel parameter that fluctuates according to supply of the gas fuel to the cylinder in a state where only the gas fuel is supplied experimentally to one cylinder serving as a judgment object without supplying with the liquid fuel and the liquid fuel is supplied to other cylinders; and a switching step of switching the fuel to be used for engine operation from the liquid fuel to the gas fuel when it is judged that the gas fuel can be supplied to all of the cylinders.

* * * * *